United States Patent [19]

Stelmack

[11] 4,115,047

[45] Sep. 19, 1978

[54] APPARATUS FOR QUENCHING BLOWN FILMS

[76] Inventor: Joseph J. Stelmack, 22 Elmwood Ter., Wayne, N.J. 07470

[21] Appl. No.: 720,929

[22] Filed: Sep. 7, 1976

[51] Int. Cl.² ............................................. B29D 23/04
[52] U.S. Cl. ..................................... 425/72 R; 264/28; 264/95; 425/143; 425/326.1; 425/404; 425/445
[58] Field of Search .................... 425/67, 68, 71, 72 R, 425/326.1, 387.1, 404, 445, 143; 264/28, 95, 237, 94, 98, 209

[56] References Cited

U.S. PATENT DOCUMENTS

| 3,226,459 | 12/1965 | Tijunelis | 264/28 X |
|---|---|---|---|
| 3,576,929 | 4/1971 | Turner et al. | 264/95 X |
| 3,789,093 | 1/1974 | Bose | 264/98 X |
| 3,888,609 | 6/1975 | St. Eve et al. | 425/72 R |

FOREIGN PATENT DOCUMENTS 805,858  12/1958  United Kingdom ................... 425/72 R Primary Examiner—Francis S. Husar
Assistant Examiner—Mark Rosenbaum
Attorney, Agent, or Firm—James J. Cannon, Jr.; James J. Cannon

[57] ABSTRACT

Apparatus for rapid cooling of blown tubular polymer films including a cryogenic flash chamber having a spray manifold from which a cryogenic fluid is sprayed toward molten polymer exiting from an annular die of an extruder. The sprayed cryogenic fluid quickly vaporizes and impacts the molten polymer to cool and solidify the polymer into a tube or bubble. A gas recirculating system driven by a blower is also utilized with an "air" ring at the base of the cryogenic flash chamber to initiate the cooling process. The cryogenic flash chamber is divided into two zones with independent temperature controls to produce films of different clarity and strength characteristics.

2 Claims, 2 Drawing Figures

APPARATUS FOR QUENCHING BLOWN FILMS

BACKGROUND OF THE INVENTION

1. Field of the Invention

This invention pertains to an apparatus for cooling blown polymer films in a cryogenic flash chamber using a sprayed cryogenic fluid which vaporizes at an extremely low temperature for cooling many gauges and types of polymer films.

2. Description of the Prior Art

Many methods are presently known for cooling blown tubular polymer films. A recent example in the patented art is U.S. Pat. No. 3,576,929, which is directed to a method for cooling blown, thin gauge polymer films.

In conventional blown film manufacturing an air ring is the primary method of reducing the temperature of the polymer to the crystalline state from the molten state. The air ring may use refrigerated air or external ambient air to aid in heat transfer. Several other proprietary processes are available using an internal or external mandrel, water process, or an internal cooling device. The goal of all these devices is to produce a better, more uniform product at a higher production rate. Mechanical film properties improve with some of these processes.

In the present state of the art process, the molten polymer is extruded from an annular die. An "air" ring blows air on the material to reduce the temperature by convection and aids in bubble stability. The frost line is the area where the molten material crystallizes. The frost line should remain relatively close to the die to maintain a uniform process, i.e. on a 20 inch diameter bubble, the frost line should be approximately 18 to 24 inches above the die. Above the frost line the film cannot yet be collapsed until it has cooled down to about 125° F. If the film is collapsed too soon, the pressure from the nip roll and lack of air between layers of film will cause the film to block, that is, stick to itself. To let the film get as cool as possible, the time period from when the material leaves the die to when it collapses should be as long as possible. Obviously, the slower the speed the longer the time period, but this also means slower production. By having the distance as great as possible between the die and nips, maximum production is possible with minimum degradation of properties.

The present art has two major deficiencies. The first deficiency is the slowness of the cooling process. This serves a limiting factor on the production rate of the extruder. The second major deficiency is that the present methods limit the types and gauges of polymer films which can be extruded and cooled. The apparatus and method of the present invention overcomes these deficiencies by spraying a rapidly vaporizing cryogenic fluid near the frost line to cool the blown film more quickly. It also utilizes the extremely cold vapors of the cryogenic fluid to feed an "air" ring, thereby commencing the crystallization of the molten polymer at a faster rate than presently possible. This, in turn, permits the cooling of a wider variety of polymer films. The addition of a conductions device will enable the most efficient heat transfer.

SUMMARY OF THE INVENTION

In the manufacture of thermoplastic and polymer films, after extruding the heat plastified material in the form of a tube, the tube is inflated and then collapsed at its end distal from the die to form a closed gas space. The improvement comprises an apparatus for quickly cooling the film within a closed housing defining a cryogenic flash chamber arranged so as to provide a nearby closed space surrounding the extruded tube. The housing defines a base end opening which is in sealing engagement with the extruded tube and an upper end opening which permits the exhaust of some vapor about the tube, and the tube thereby functions as an inner wall which further defines the chamber. The film is cooled by spraying a cryogenic fluid into the cryogenic flash chamber near the frost line. When the fluid is in the chamber it vaporizes and its vapors cool the film. Some of the vapors are pulled from the upper level of the chamber by a blower and are fed to an air ring at the point at which the film leaves the extrusion die orifice. The cryogenic fluid is preferably one with a boiling point of −196° C and thus is well below the temperature of the heat plastified polymer. As a spray device injects the cryogenic fluid into the cryogenic flash chamber, the fluid vaporizes adjacent to the film. The vapors rise to the top of the chamber, creating a temperature differential within the upper and lower portions of the chamber. This temperature differential is controllable and may be utilized in the determination of gauges and types of polymer film to be cooled.

The cold gas brings the molten polymer to a solid at the frost line. To aid in the initial solidification, stability and cooling efficiency, a gas recirculating system is also used, as stated above. A blower draws in cold gaseous cryogenic vapors from the upper portion of the cryogenic flash chamber. An adjustable baffle is provided to regulate the flow of gas. An "air" ring at the orifice of the extrusion die receives this cold gas and adjustably discharges it onto the molten polymer. This cold gas starts the crystallization of the polymer and aids in the heat transfer process. The remaining vaporized gas rises and escapes through the top of the cryogenic flash chamber, causing continuous solidification and cooling as it rises. The addition of a conduction device in the form of a ring around the plastic tube above the frost line enables the most efficient heat transfer.

The apparatus comprises a substantially closed housing defining a cryogenic flash chamber for cooling blown tubular polymer films and end openings. The housing is adapted to be positioned about a polymer film tube, with one end opening to be in sliding engagement with said tube and the other opening to permit the exit of said film and the warming gas. The apparatus further includes an "air" ring about its base for blowing very cold gases on said film as it exits from the extrusion die and a temperature control system for maintaining a differential in temperature in the upper and lower portions of the cryogenic flash chamber. A cryogenic fluid spraying means is attached to the walls of the housing near the frost line. In order to recycle some of the cold vapor, a blower driven recirculation system is used to draw cool vapor from the upper portion of the cryogenic flash chamber to the air ring under adjustable damper control and temperature control. The addition of a conduction device will provide maximum efficiency of the cryogenic fluid.

DESCRIPTION OF THE PREFERRED EMBODIMENT

Figure 1:
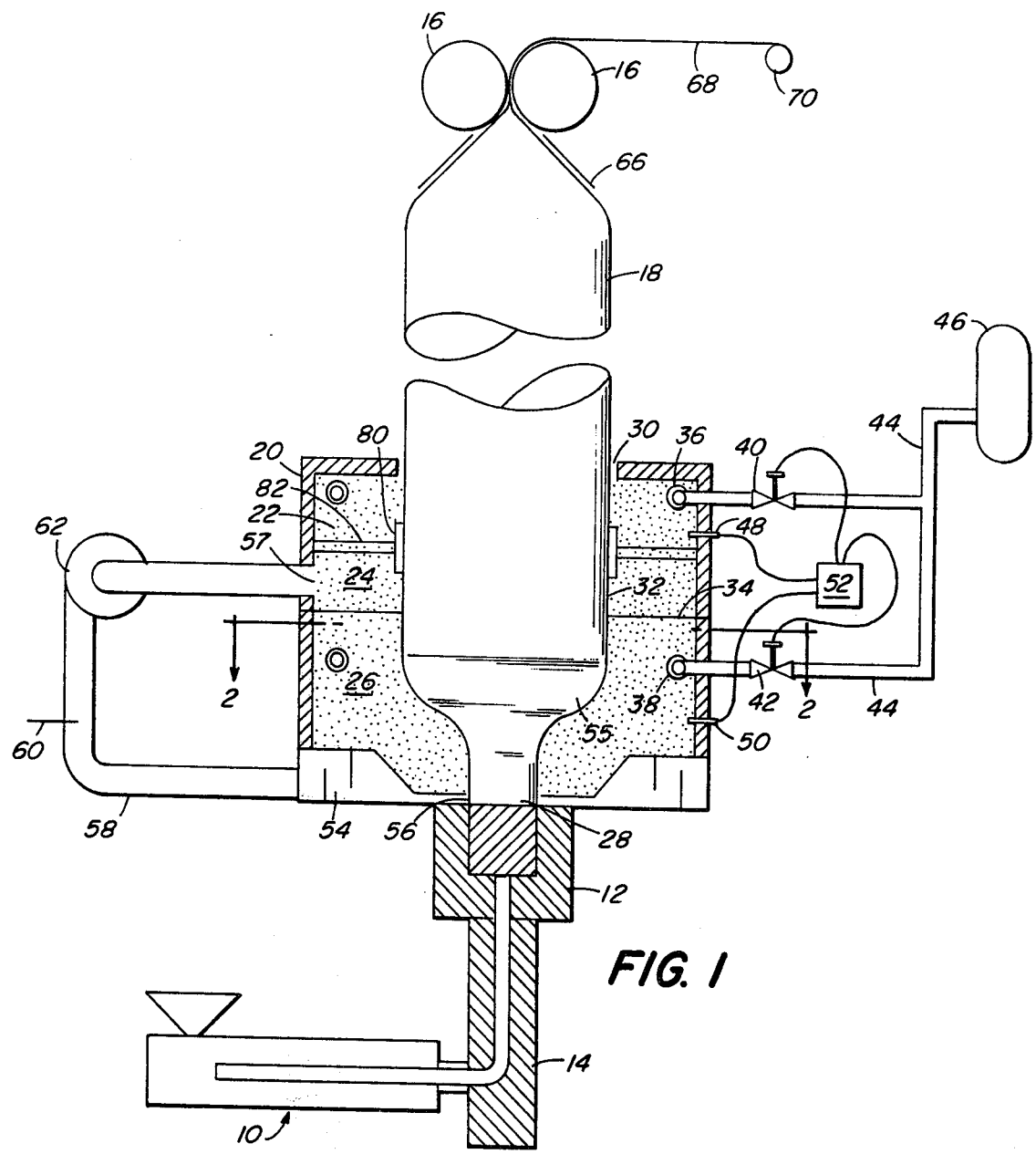
FIG. 1 is a schematic cross-sectional representation of an entire extruder, cryogenic cooling chamber and film windup apparatus of the invention.

In accordance with the principles of the present invention and referring now to the apparatus illustrated in the drawings, the apparatus of FIG. 1 consists of an extruder 10 of conventional construction having an upwardly extruding annular die 12 in communication therewith through an adapter 14. Sets of nip rolls 16 are spaced upward from the die along the axis of a generally vertically disposed extruded film tube 18. A film windup apparatus or other equipment (not shown) is spaced from the nip rolls 16.

The means for cooling the extruded film tube 18 consist of a housing 20 defining an axially elongated toroidally shaped partially closed cryogenic flash chamber 22 which is divided into upper and lower zones 24, 26, with end openings 28, 30 in which the axis of the chamber coincides with the axis of the extruded tube 18. The extruded tube 18 is disposed inside the housing and forms an inner wall 32 which further defines an annular chamber 34. Upper and lower spray manifolds 36, 38 are disposed inside housing 20, one in upper flash chamber 24 and one in lower flash chamber 26. Spray manifolds are controlled by flow control valves 40, 42 which control the supply of a cryogenic fluid through pipes 44 from tank 46. Thermocouples 48, 50 are connected to temperature control 52 to measure the temperatures in upper and lower flash chambers 24, 26. A so-called "air" ring 54 is positioned at the base of housing 20 and just above the orifice 28 of extrusion die 12. "Air" ring 54 has an adjustable opening 56 for permitting the flow of cold cryogenic vapors on molten polymer film as it exits from die 12. "Air" ring 54 is connected by tubing 58 through adjustable baffle 60 and blower 62 to an inlet in upper cryogenic flash chamber 24. Vaporized cryogenic gases are drawn through inlet 57 by blower 62 through baffle 60 and tubing 58 to orifice 56 in "air" ring 54 to perform the initial cooling of the molten polymer.

The method or process of the invention may be applied successfully to any thermoplastic film. In brief the extruder 10 is of conventional design. The extruder 10 is normally oriented on a horizontal plane, but may be oriented on a vertical plane. Molten polymer material enters an adapter 14 flowing through a channel into the annular die 12. While the figure illustrates a vertical, upward extrusion, this could be lateral or downward. Annular die 12 may be also of spiral or spider or other construction. As the molten polymer exits from the orifice of die 12 at a temperature of 135°–230° C, it is blown by an extremely cold vapor from a cryogenic fluid from orifice 56 of "air ring" 54 at the base of cryogenic flash chamber 22. As the molten polymer begins to cool to a film, it rises in lower cryogenic flash chamber 26 to a point known as the frost line 55 at which it crytallizes and solidifies into a tube or bubble. The flash chamber 22 itself is cooled by the injection through manifolds 36, 38 of a cryogenic fluid which vaporizes and expands to fill flash chamber 22. As the cryogenic vapor rises in flash chamber 22 a portion is diverted through orifice 57 by blower 62 through tubing 58 and adjustable damper 60 to air ring 54 to supply the initial cooling. It should be noted that the method or process of this invention utilizes two temperature zones which may vary in temperature. The cryogenic vapors blown through air ring 54 have been drawn from upper flash chamber 24 and are the warmest vapors used. The lower cryogenic flash chamber 26 is supplied by spray manifold 38 near the frost line. At this point the molten polymer is in the process of film formation and is still fairly warm. Hence, as a result of heat transfer, the cryogenic vapors in this chamber 26 will warm quickly and rise, as will the vapors from air ring 54. In upper cryogenic flash chamber, spray manifold 36 supplies more cryogenic fluid to be vaporized. This upper zone 24 of flash chamber 22 is also fed by rising, warming vapors from air ring 54 and lower flash chamber 26. Each zone 24, 26 of flash chamber 22 is monitored by a thermocouple 48, 50 connected to a temperature control unit 52. The supply of cryogenic fluid to manifolds 36, 38 is also controlled by flow control valves 40, 42, activated by the temprature control unit 52. Thus, precise control of the processing temperature may be maintained in both portions 24, 26 of cryogenic flash chamber 22.

The addition of a conduction device 80 in the form of a ring adjacent to the blown film bubble 18 above frost line 55 causes a very efficient heat transfer and results in the use of less cryogenic gas. Conduction device 80 is mounted to housing 20 by radial steel arms 82.

The process of this invention may be applied to any thermoplastic film. Liquids which are useful as coolants are those which have extremely low boiling points, which boiling points are below the solidification point of the polymer and which do not detrimentally affect the film. The preferred coolant for the apparatus of this invention is liquid nitrogen, which has a boiling point of −196° C.

As the polymer solidifies into a tube 18 or bubble, it is drawn upward by the take-up nips 16. The tube is being cooled during this movement through cryogenic flash chamber 22 such that when it approaches opening 30, it is already below 150° F. Opening 30 is slightly larger than tube 18 and also permits the escape of vapors. After the cooled film has exited from cryogenic flash chamber 22, it is collapsed by frame 66 to a lay-flat 68. The lay-flat is pulled by nip roll 16 to a collection device 70 or other fabrication device.

To recapitulate the process, the blown tube is cooled and solidified primarily at the frost line in lower cryogenic flash chamber 26. The temperature in chamber 26 is measured by thermocouple 50 and through temperature control unit 52 the fluid flow valve 42 is controlled to allow liquid nitrogen to flow into the lower spray manifold 38 from supply line 44 from tank 46. As the cryogenic liquid is sprayed through spray manifold 38, preferably liquid nitrogen having a boiling point of −196° C, it immediately vaporizes into gaseous nitrogen. This cold gas causes the molten polymer to solidify at the frost line. The addition of a conduction device in the form of a steel ring around the plastic tube above the frost line enables the most efficient heat transfer. To aid in the initial solidification and in cooling efficiency, a gaseous recirculation system is also used. A blower 62 draws in cold gaseous nitrogen from upper flash chamber 24 through inlet 57 and through tubing 58. An adjustable baffle is provided to adjust the flow of this gaseous nitrogen to the "air" ring 54 where it is discharged through adjustable orifice 56 on to molten polymer exiting from die 12. Orifice 56 may be adjusted to control the angle and power of the gaseous blast on the polymer.

The capability to maintain different temperatures in the upper (24) and lower (26) flash chambers gives the process flexibility in producing films of differing strength and clarity.

Figure 2:
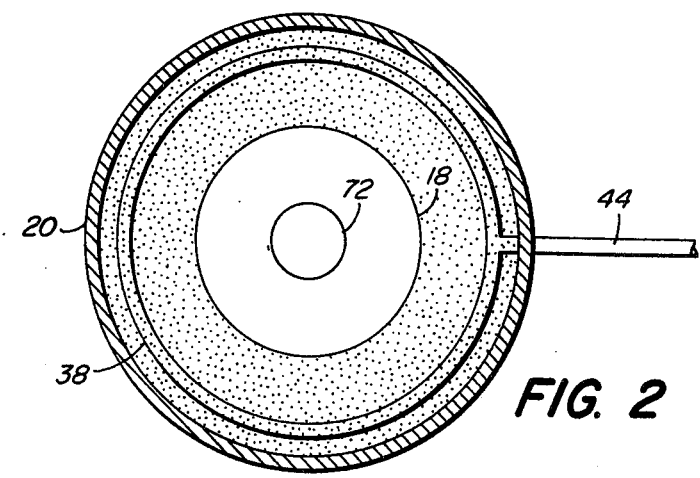
FIG. 2 is a lateral cross-sectional view taken along the lines 2—2 of FIG. 1.

FIG. 2 is a cross-sectional view taken along the lines 2—2 of FIG. 1 to show the relative positions of housing 20, spray manifold 38, tube 18 and die orifice 72 of die 12. A pipe 44 is also shown to spray manifold 38.

The process of the present invention, by introducing an extremely cold vapor near the frost line immediately reduces the temperature of the polymer film from about 350° F down to about 100° F. The result is an increase in production rates and a reduction in the distance from die 12 to nip rolls 16. This reduction also improves film quality.

Additionally, the use of an extremely cold inert gas, colder than air, in the "air" ring 54, improves the optical qualities of the blown film, as well as improving the physical properties such as sealability.

The use of a cryogenic fluid spray allows rapid evaporation of a liquified gas in an area immediate to the tubular bubble 18. As the gas is evaporated from its liquid state, it absorbs heat from the plastic tube. An inert gas then forms a protective layer around the bubble 18, protecting the film from oxidation. Liquid nitrogen is inexpensive, inert, and has a boiling point of −196° C, making it an ideal cryogenic fluid for this apparatus.

The apparatus of the present invention encompasses tube 18 in a controlled temperature environment, whereas the present state of the art normally has the tube processed at ambient temperature. The "air" ring 54 supplies forced convection cooling to crystallize the polymer. The cold gases in the flash chamber provide continuous cooling to improve the production rate and film properties.

As is apparent from the foregoing specification, the present invention is susceptible of being embodied with various modifications which may differ particularly from those described in the previous specification. For this reason it is to be fully understood that all of the foregoing is intended to be merely illustrative and is not to be construed or interpreted as being restrictive or otherwise limiting of the present invention.

I claim:

1. An improved apparatus for quenching blown films produced by an extruder through an orifice of a die attached thereto by an adapter such that a heat plastified polymeric film enters into a cooling chamber housing, wherein the improvement comprises;
    said cooling chamber housing being a substantially cylindrical structure with an opening at the top to permit the passage of quench blown films therethrough;
    said cooling chamber housing being secured at its base to said extruder immediately above the orifice of said die;
    a cryogenic flash chamber defined by said cooling chamber housing and having two zones, an upper cryogenic flash chamber and a lower cryogenic flash chamber;
    a first spray manifold located at a point near the middle of said cryogenic flash chamber and in the lower zone thereof but above the frost line for spraying a cryogenic coolant fluid into said cryogenic flash chamber so that the fluid vaporizes to cool such a film passing through the cryogenic flash chamber such that said film is sprayed after it has already started to solidify;
    means to recirculate said vapors of said cryogenic coolant comprising:
    an outlet near the top of said cryogenic flash chamber;
    an air ring encircling the base of said cooling chamber housing;
    piping from said outlet to said air ring near the orifice of said die;
    a blower and adjustable baffles within said piping to draw an even, controlled flow of coolant vapors from said upper cryogenic flash chamber through said air ring onto molten polymer exiting from said die;
    means to control the temperature of the vapor in said cryogenic flash chamber comprising:
    a thermocouple through said housing;
    a temperature control device connected to said thermocouple;
    a flow control valve in said piping between said first spray manifold and said cryogenic fluid supply means;
    said flow control valve being controlled by said temperature control unit;
    a supply tank and piping means operatively associated with said spray manifold to supply cryogenic coolant fluid to said spray first manifold;
    a second spray manifold located in said upper cryogenic flash chamber;
    a piping connecting said second spray manifold to said cryogenic fluid supply means;
    a second thermocouple through said housing;
    a second temperature control device connected to said thermocouple;
    a second flow control valve in said piping between said second spray manifold and said cryogenic fluid supply means;
    said second flow control valve being controlled by said second temperature control unit.

2. The apparatus of claim 1 further comprising:
    a conduction device in the form of a ring adjacent to said tubular polymer film;
    radial arms operatively associated with said conduction device to secure said conduction device to said housing.

* * * * *